United States Patent [19]

Haynes et al.

[11] 4,348,889
[45] Sep. 14, 1982

[54] MEASURING SHEET THICKNESS

[75] Inventors: Anthony C. Haynes, Newick; Derek K. Unwin, Bexhill-on-Sea, both of England

[73] Assignee: Sussex Instruments Limited, England

[21] Appl. No.: 194,835

[22] Filed: Oct. 7, 1980

[30] Foreign Application Priority Data

Oct. 8, 1979 [GB] United Kingdom ............... 7934826

[51] Int. Cl.³ .......................................... G01B 13/06
[52] U.S. Cl. .................................................. 73/37.7
[58] Field of Search ..................................... 73/37.7

[56] References Cited

FOREIGN PATENT DOCUMENTS 367700 2/1932 United Kingdom .
631942 11/1949 United Kingdom .
1455426 11/1976 United Kingdom .

OTHER PUBLICATIONS pp. 142-145 of Engineering Metrology 3d Ed. (Metric) K. J. Hume, Publ. By MacDonalds Tech & Scientific.
pp. 248-251, Engineering Precision Measurements, Judge, Publ. by Chapman & Hall, 1957.
pp. 30-33, Metrology and Precision Engineering, Scarr, Publ. by McGraw-Hill, 1967.

Primary Examiner—Stuart S. Levy
Assistant Examiner—Joseph W. Roskos
Attorney, Agent, or Firm—Bacon & Thomas

[57] ABSTRACT

Pneumatic sheet thickness measuring apparatus includes a chamber to which air is supplied via a restriction, and a nozzle positioned adjacent a sheet to be measured via which nozzle air can escape from the chamber. The effective area from which air can escape with a sheet of nominal thickness is in the range of substantially 0.3 to 0.9, preferably 0.6, times the area of the restriction.

Air is also supplied to a second restriction, chamber and nozzle providing the same area ratio and the difference in the pressures in the two chambers is monitored with a differential pressure transducer.

The sheet to be measured is supported on a reference roller and the nozzle assembly is mounted above the roller on a carriage one end of which is carried by a bearing and the other end of which runs on a vertically adjustable rail. The horizontal distance from the bearing to the nozzle is substantially greater than the horizontal distance from the rail to the nozzle whereby inaccuracies in the bearing have relatively little effect on the vertical position of the nozzle.

14 Claims, 4 Drawing Figures

CURVE SHOWING NOZZLE PRESSURE VARIATION P.OUT. RELATIVE TO NOZZLE AREA AN, WHILE INPUT PRESSURE P.IN & FLOW RESTRICTION AREA AR ARE CONSTANT.

MEASURING SHEET THICKNESS

This invention relates to apparatus and a method for distance measuring, e.g. for measuring the thickness of a sheet of material, such as plastics or rubber sheets.

In the production of plastics and rubber sheets it is desirable to measure the thickness of the product for the purpose of controlling the production process. Some materials are liable to vary in their composition and thus it is preferable to employ a measuring technique which does not require the physical contact of a measuring head with the sheet material. Pneumatic gauging provides a suitable technique but prior pneumatic gauges have suffered from the disadvantage that a very small air gap was provided between the nozzle and the material being measured because at the pressures used a large air gap would lead to a very high air flow rate. Conventionally a servotracking system is employed to keep the measuring nozzle a fixed distance from the sheet being measured and the thickness is then indicated by detecting the movement of the servosystem. In continuous production this leads to heavy wear in the servosystem which typically varies continuously up to about 3% from the nominal position. Furthermore the servosystem is unable to respond to rapid variations in the material thickness. It is possible to use an air nozzle held at a fixed distance above a moving sheet but in this case the nominal gap must be large enough to accommodate all sheet thickness variations. Then either a high air flow must be tolerated or a very complex low pressure regulator (e.g. operating at a few inches water gauge) must be used. A further problem is that using a fixed nozzle the back pressure from the nozzle varies non-linearly with the distance of the surface being measured. This non-linear output is not suitable for direct use in measuring or controlling a process.

According to the invention we provide a method of indicating the thickness of a sheet of material which may vary about a nominal thickness, in which air is directed onto the surface of the material from a nozzle which communicates with a chamber which is supplied with air via a restriction, comprising positioning the nozzle such that with a sheet of nominal thickness the effective area of the nozzle from which air can escape is in the range of substantially 0.3 to 0.9 times the area of the restriction, and detecting and indicating the pressure in the chamber.

We have investigated the drop in pressure from the source to the chamber with variations in the ratio of the restriction effective area to the nozzle effective area and we have found that over a range centred on 0.6 and extending from about 0.3 to 0.9 the ratio of the effective areas of the restriction and nozzle is almost linearly related to the pressure reduction ratio (see FIG. 4 of the accompanying drawings). Thus if the source pressure and restriction area were fixed, the chamber pressure would vary linearly with variations in the nozzle effective area.

According to another aspect of the invention we provide a pneumatic measuring apparatus comprising a source of air under pressure, a nozzle arranged to direct a flow of air at a surface whose distance from the nozzle is to be indicated, the nozzle being supplied from a chamber which air from the source enters via a restriction, and means arranged to indicate the pressure in the chamber, the ratio of the effective area of the nozzle to that of the restriction being from about 0.3 to about 0.9 when the surface is at a predetermined distance from the nozzle. Preferably the ratio is substantially 0.6 when the pressure in the chamber will be about 73.5% of the source pressure.

If this operating point is used the output of the pressure indicator will vary linearly with the nozzle effective area over a useful range.

If the nozzle takes the form of a circular aperture directing air normally onto a surface, the effective area of the nozzle depends on the area across which air can escape parallel to the surface and this is proportional to the circumference of the circular nozzle and the distance of the nozzle from the surface. Thus the pressure indication will vary linearly with the distance of the surface from the nozzle over a useful range. If the nozzle effective area is 0.6 times the area of the restriction the distance of the surface can vary about plus or minus 50% whilst a linear pressure indication response results.

According to a feature of the invention, the apparatus further comprises a second chamber having an outlet nozzle and an inlet restriction and supplied from the same source as the first-mentioned chamber, and a differential pressure transducer arranged to indicate the difference in the pressures in the two chambers, the ratio of the effective areas of the nozzle and restriction of the second chamber being substantially equal to the ratio of the effective areas of the nozzle and restriction of the first-mentioned chamber when the surface is at the predetermined distance from the nozzle.

When the surface is at the predetermined distance from the nozzle, e.g. for a sheet of correct nominal thickness, the ratios of effective areas of the restriction and nozzle for both chambers are the same. Since it is the ratio of the area of the restriction to the area of the nozzle which determines the pressure drop from the source to the chamber, any change in the source pressure will result under these conditions in an equal change in the pressure in the chamber and thus the output of the differential pressure transducer will not change. Thus the apparatus is able to indicate when a sheet is of nominal thickness or is above or below the nominal thickness and the differential arrangement enables the use of an inexpensive source pressure regulator as the apparatus is insensitive to source pressure variations.

The use of this differential arrangement with the operating point referred to above results in a highly accurate and linear measuring apparatus.

It is desirable to be able to measure the thickness of a sheet over its entire width and to do this we propose to scan a nozzle from side to side across the sheet. For a nominal gap between the nozzle and the sheet of 1 mm the apparatus may typically measure variation of up to 0.25 mm in the sheet thickness. Thus clearly a very accurate mounting of the nozzle with respect to the sheet is required.

According to a further feature, the sheet thickness measuring apparatus comprises a reference roller arranged to support a sheet to be measured, and a measurement head mounted above the roller so as to be movable parallel to the axis of the roller, the measurement head being mounted between the ends of a carriage one end of which is carried by a bearing and the other end of which runs on a rail which is vertically adjustable so as to be positionable parallel to the surface of the roller, the horizontal distance from the bearing to the measuring head being substantially greater than the horizontal distance from the rail to the measuring head.

By this means the measuring head may be supported such that its vertical position is primarily determined by an accurately adjustable rail and such that any inaccuracies in the bearing have relatively little effect on the vertical position of the measuring head.

An embodiment of the invention will now be described by way of example and with reference to the accompanying drawings, in which.

Figure 1:
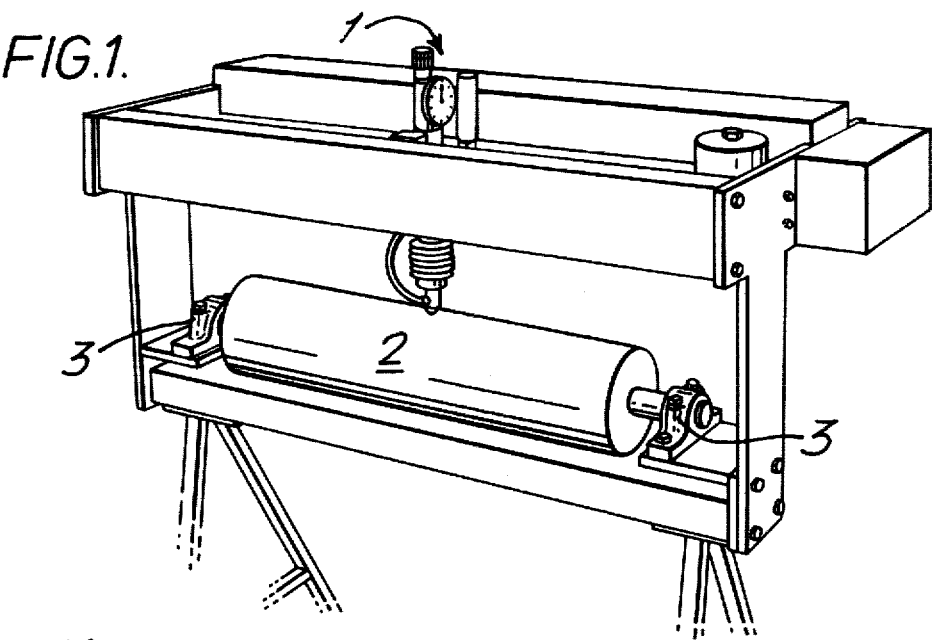
FIG. 1 is a perspective view of a sheet thickness measuring apparatus according to the invention.
Figure 4:
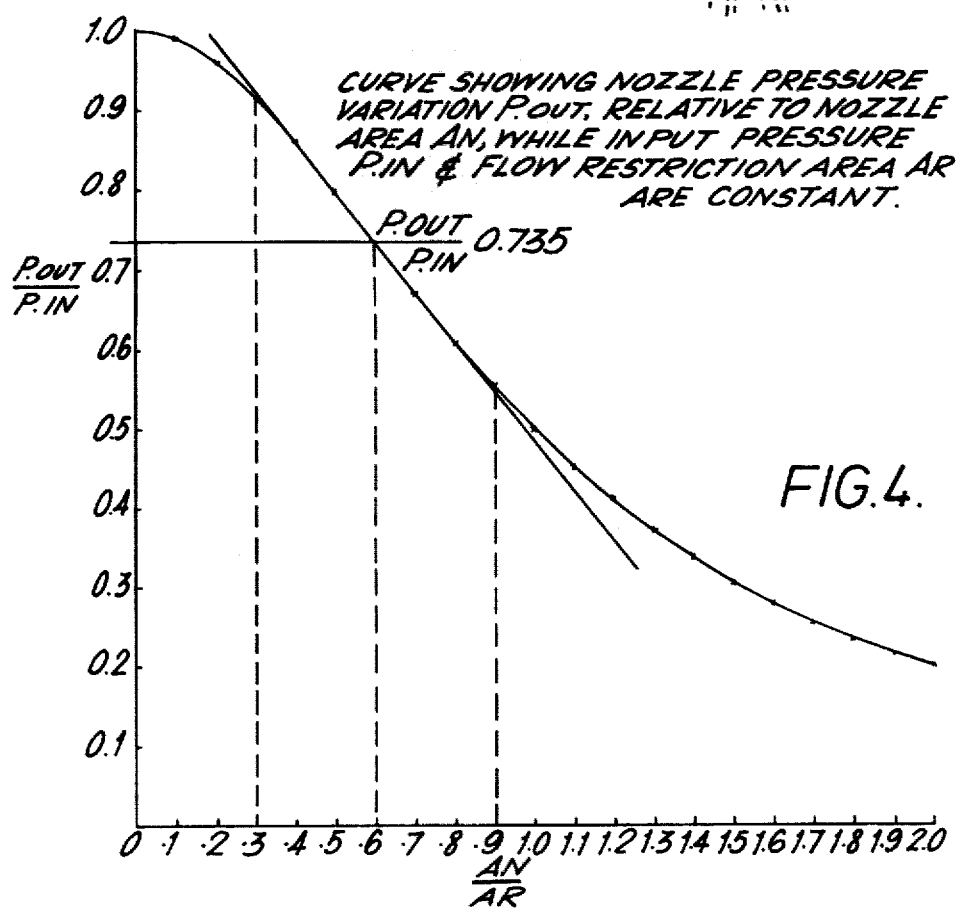
FIG. 4 is a graph already referred to showing the relation between the pressure reduction across a restriction and the ratio of the restriction and nozzle effective areas.
Figure 2:
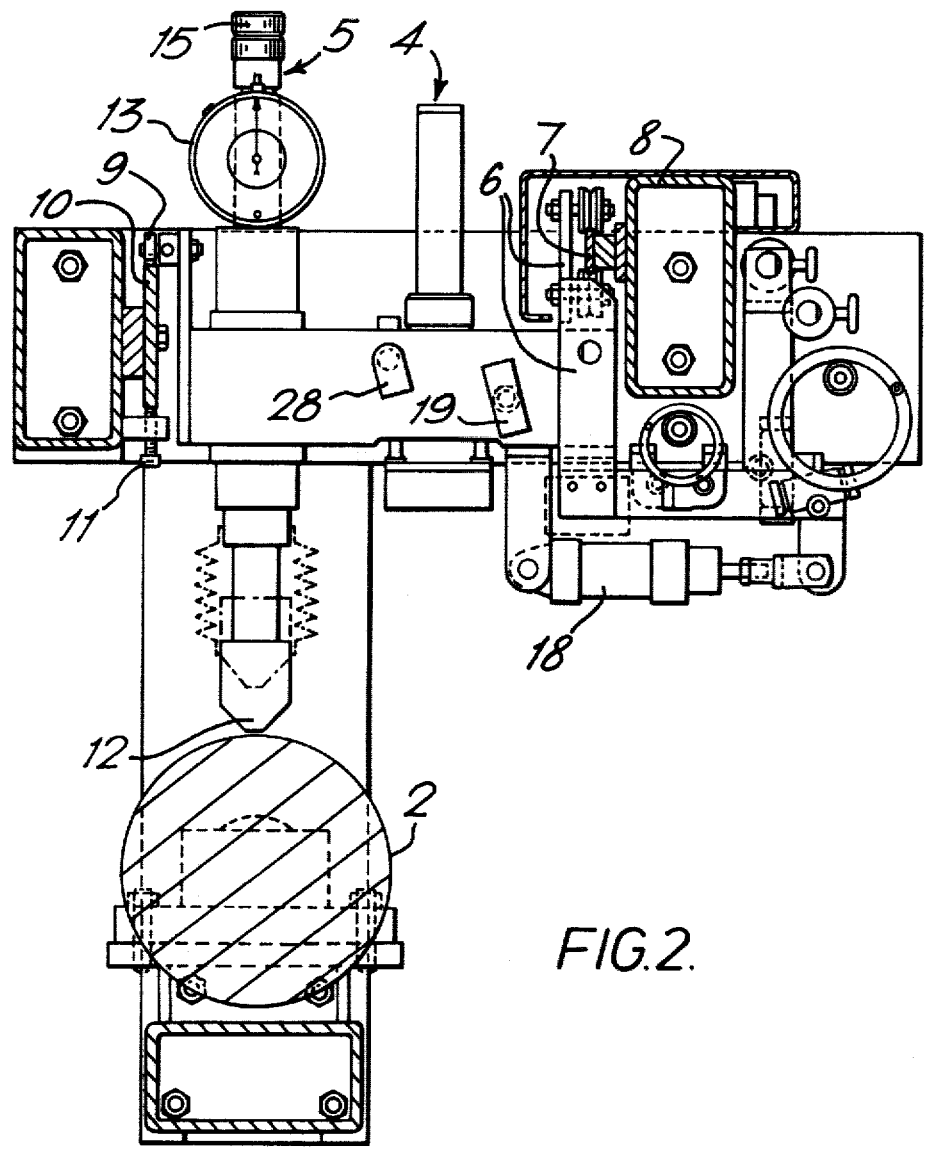
FIG. 2 is a cross-section through the apparatus of FIG. 1.
Figure 3:
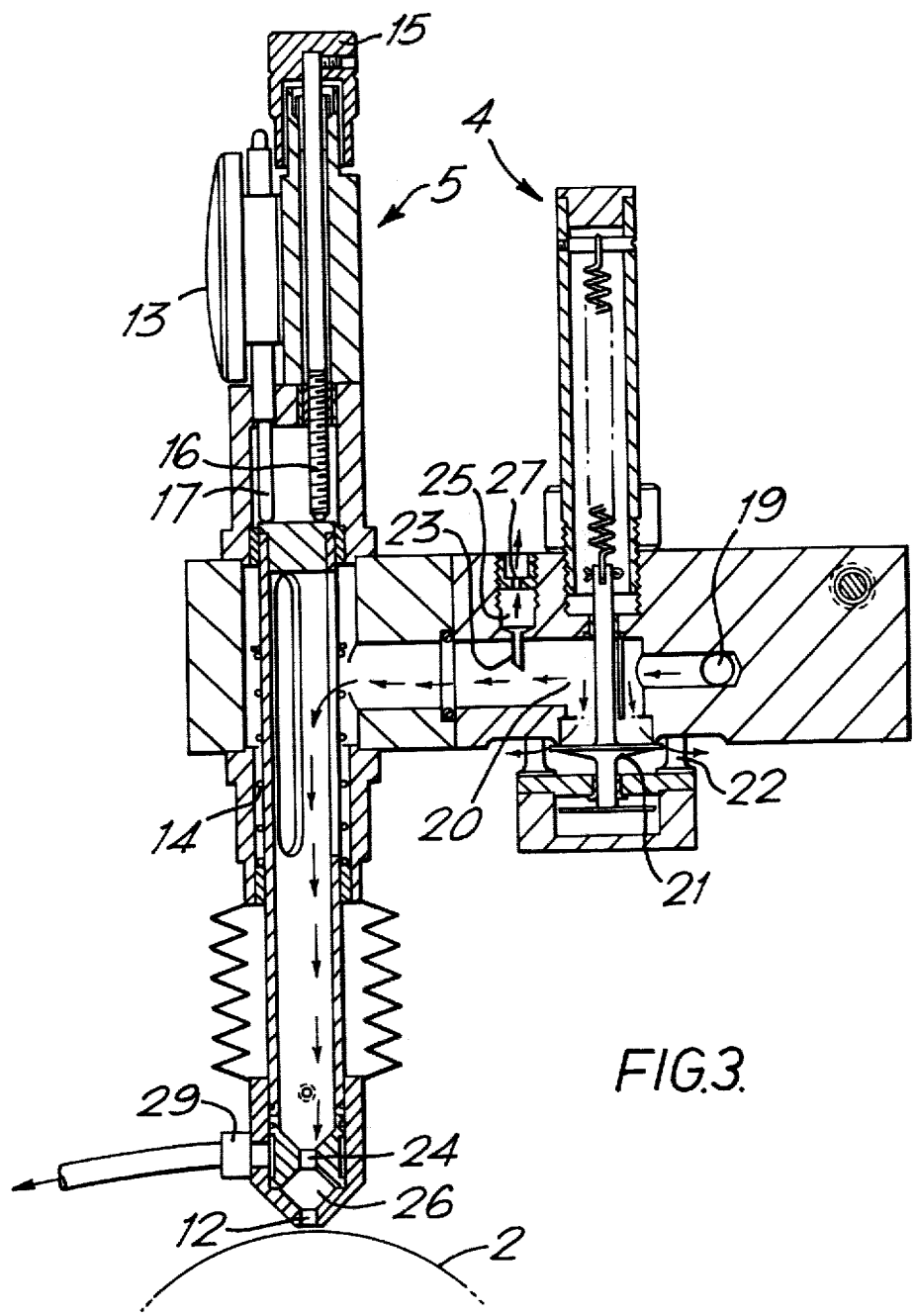
FIG. 3 is a detail cross-section through the pressure regulator and nozzle unit of the apparatus of FIGS. 1 and 2.

Referring to the drawings, the measuring apparatus comprises a measuring head 1 mounted above a precision ground reference roller 2. The roller 2 is rotatably mounted in bearing 3 and in use the roller rotates as sheet material to be measured passes between the measuring head and the roller.

The measuring head 1 comprises a pressure regulator 4 and a nozzle unit 5 and is pivotally mounted on a carriage 6. The carriage 6 is mounted on a precision ball slide 7 supported by a beam 8 so as to be movable parallel to the axis of the roller. The ball slide 7 is capable of supporting the carriage 6 to a vertical accuracy of about 0.025 mm as the carriage moves across the width of the roller. At its other end the nozzle unit is supported by a ball roller 9 which runs on a precision linear rail 10 which is vertically adjustable via a number of adjustment screws 11 spaced along its length. The rail 10 may be positioned and flexed by the screws 11 so as to be exactly parallel to the reference roller 2 so as to compensate for any errors in the alignment of the reference roller with the ball slide 7 or any taper or sag in the reference roller due to its weight. The horizontal distance between rail 10 and nozzle unit 5 is less than that between nozzle unit 5 and ball slide 7 so that any vertical errors in ball slide 7 has relatively little effect on the vertical position of the nozzle unit 5.

In use a nozzle 12 of the nozzle unit 5 is positioned a small distance (e.g. 1 mm) above a sheet whose thickness is to be measured, the underside of the sheet being supported by the reference roller 2. The measuring head is scanned from side to side of the sheet being measured by an electric motor connected by a cable to the carriage 6. The length of the scan is controlled by means of a push rod operated by the carriage 6 at preset but adjustable positions so as to actuate a microswitch controlling the motor. A pneumatic and electrical measuring device to be described indicates deviations in the thickness of the sheet from its nominal thickness and may be used for the initial adjustment of the rail 10 by scanning the measuring head 1 across the roller 2 with no material present. The nozzle 12 may be raised away from the roller 2 by operation of a pneumatic jack or solenoid 18.

The nozzle unit 5 is provided with a dial gauge 13 to indicate vertical movement of the nozzle 12. The nozzle 12 is urged upwardly by a spring 14 and may be adjusted in position by a screw threaded knob 15 through an operating element 16. The probe 17 of the dial gauge rests on the same surface as the operating element 16.

Referring now to the regulator 4 and nozzle unit 5, low pressure air is supplied to the regulator through an inlet port 19 and flows to a chamber 20. The pressure in the chamber 20 is regulated by a valve 21 which allows air to escape to atmosphere through orifices 22. The air of regulated pressure then flows through restrictions 23 and 24 to respective chambers 25 and 26. Chamber 25 opens to atmosphere via a nozzle 27 and chamber 26 opens to atmosphere via nozzle 12 which is obstructed to a greater or lesser extent in accordance with the thickness of material between the nozzle 12 and the roller 2. A port 28 communicates with the chamber 25 and a port 29 communicates with the chamber 26. The ports 28 and 29 are connected by pipes to opposite sides of a differential air pressure transducer and the electrical output of the transducer is proportional to the difference between the pressures in the chambers 25 and 26.

The ratio of the areas of the restriction 23 to the nozzle 27 is 10:6 so that the pressure in the chamber 25 is substantially 73.5% of the regulated pressure in the chamber 20. Similarly, the sizes of the restriction 24 and nozzle 12 are chosen such that when a sheet of nominal thickness is present (e.g. when the nozzle is 1 mm from the surface of the sheet) the ratio of the area of the restriction 24 to the effective air escape area of the nozzle 12 is 10:6, again leading to a pressure of substantially 73.5% of the regulator pressure in the chamber 26 when a sheet of nominal thickness is present. Thus variation in the gap between the nozzle 12 and the sheet over a range of about plus or minus 50% of the nominal gap will result in a proportionate variation in the pressure in the chamber 26, i.e. the pressure varies linearly with the gap around the operating point described. An electrical indicator connected to the differential pressure transducer referred to above and arranged to use only half of the available linear band will thus give a full scale indication for a 25% change in the gap, i.e. full scale indication corresponds to a variation in sheet thickness of 0.25 mm for a nominal 1 mm gap, the indication being highly linear. The differential pressure transducer may be a conventional type having a working range up to 6" (150 mm) water gauge.

The indicating system produces a zero output when the sheet is of the correct thickness and the indication varies positively or negatively with thickness deviations above or below the nominal thickness. The air pressure from the regulator does not affect the zero indication at the nominal thickness because at the nominal thickness the pressure in the chambers 25 and 26 will change equally with changes in the regulated pressure.

What is claimed is:

1. A method of indicating the thickness of a sheet of material which may vary about a nominal thickness, in which air is directed onto the surface of the material from a nozzle which communicates with a first chamber which is supplied with air via a restriction, comprising the steps of:

(a) positioning the nozzle such that, with a sheet of nominal thickness, the effective area of the nozzle from which air can escape is smaller than the area of the restriction;

(b) supplying air from the same source as that from which the first chamber is supplied to a second chamber having an outlet nozzle and an inlet restriction, the ratio of effective areas of which is substantially the same as that of said nozzle and said restriction of said first chamber; and, (c) monitoring the difference in the pressures in the two chambers with a differential pressure transducer so that the monitored output is substantially insensitive to pressure variations of said source, said monitored output indicating said thickness.

2. A method as claimed in claim 1 in which the effective area of the nozzle from which air can escape is in the range of substantially 0.3 to 0.9 times the area of the restriction.

3. A method as claimed in claim 1 in which said effective area of the nozzle is substantially 0.6 times the area of the restriction.

4. A method as claimed in any of claims 3, 1 or 2 comprising scanning said nozzle transversely across said sheet to measure the thickness of the sheet over its entire width.

5. A method as claimed in claim 4 comprising supporting said sheet on a reference roller, mounting said nozzle above the roller on a carriage one end of which is carried by a bearing and the other end of which runs on an adjustable rail, the horizontal distance from the bearing to the nozzle being substantially greater than the horizontal distance from the rail to the nozzle, and adjusting said rail vertically so as to be parallel to the surface of the roller whereby inaccuracies in the bearing have relatively little effect on the vertical position of the nozzle as it scans.

6. A method of indicating the thickness of a sheet of material which may vary about a nominal thickness in which air is directed onto the surface of the material from a nozzle which communicates with a chamber which is supplied with air via a restriction, comprising the steps of:
   (a) positioning the nozzle such that with a sheet of nominal thickness, the effective area of the nozzle from which air can escape is smaller than the area of the restriction;
   (b) detecting and indicating the pressure in the chamber; and,
   (c) scanning said nozzle transversely across said sheet to measure the thickness of the sheet over its entire width by:
      (i) supporting said sheet on a reference roller;
      (ii) mounting said nozzle above the roller on a carriage, one end of which is carried by a bearing and the other end of which runs on an adjustable rail, the horizontal distance from the bearing to the nozzle being substantially greater than the horizontal distance from the rail to the nozzle; and
      (iii) adjusting said rail vertically so as to be parallel to the surface of the roller whereby inaccuracies in the bearing have relatively little effect on the vertical position of the nozzle as it scans.

7. A method as claimed in claim 6 in which the effective area of the nozzle from which air can escape is in the range of substantially 0.3 to 0.9 times the area of the restriction.

8. A method as claimed in claim 7 in which said effective area of the nozzle is substantially 0.6 times the area of the restriction.

9. A pneumatic measuring apparatus comprising:
   (a) a source of air under pressure;
   (b) a nozzle arranged to direct a flow of the air at a surface whose distance from the nozzle is to be indicated, the nozzle being supplied from a first chamber which air from the source enters via a restriction, the effective area of the nozzle being smaller than that of the restriction when the surface is at a predetermined distance from the nozzle;
   (c) means defining a second chamber having an outlet nozzle and an inlet restriction, and supplied from the same source as the first chamber, the ratio of effective areas of the outlet nozzle and the inlet restriction of the second chamber being substantially equal to the ratio of the effective areas of the nozzle and restriction of the first chamber when the surface is at the predetermined distance from the nozzle; and
   (d) a differential pressure transducer arranged to indicate the difference to the pressures in the two chambers.

10. An apparatus as claimed in claim 9 in which the effective area of the nozzle from which air can escape is in the range of substantially 0.3 to 0.9 times the area of the restriction.

11. Apparatus as claimed in claim 10 wherein the ratio is substantially 0.6.

12. A pneumatic measuring apparatus comprising:
   (a) a source of air under pressure;
   (b) a nozzle arranged to direct a flow of the air at a surface whose distance from the nozzle is to be indicated, the nozzle being supplied from a chamber which air from the source enters via a restriction, the effective area of the nozzle being less than that of the restriction when the surface is at a predetermined distance from the nozzle;
   (c) means arranged to indicate the pressure in the chamber;
   (d) a reference roller arranged to support the sheet to be measured; and,
   (e) a measurement head carrying the nozzle and mounted above the roller so as to be movable parallel to the axis of the roller, the measurement head being mounted between the ends of a carriage, one end of which is carried by a bearing and the other end of which runs on a rail which is vertically adjustable so as to be positionable parallel to the surface of the roller, the horizontal distance from the bearing to the measuring head being substantially greater than the horizontal distance from the rail to the measuring head.

13. An apparatus as claimed in claim 12 in which the effective area of the nozzle from which air can escape is in the range of substantially 0.3 to 0.9 times the area of the restriction.

14. An apparatus as claimed in claim 13 in which said effective area of the nozzle is substantially 0.6 times the area of the restriction.

* * * * *